(12) United States Patent
Xu et al.

(10) Patent No.: US 11,949,926 B2
(45) Date of Patent: Apr. 2, 2024

(54) CONTENT SHARING METHOD AND DEVICE

(71) Applicant: SAMSUNG ELECTRONICS CO., LTD., Suwon-si (KR)

(72) Inventors: Yang Xu, Nanjing (CN); Wei Huang, Nanjing (CN); Siyuan Huang, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 161 days.

(21) Appl. No.: 17/530,625

(22) Filed: Nov. 19, 2021

(65) Prior Publication Data

US 2022/0159321 A1 May 19, 2022

Related U.S. Application Data

(63) Continuation of application No. PCT/KR2021/016468, filed on Nov. 11, 2021.

(30) Foreign Application Priority Data

Nov. 18, 2020 (CN) .......................... 202011291202.8

(51) Int. Cl.
*H04N 21/2343* (2011.01)
*H04N 19/105* (2014.01)
(Continued)

(52) U.S. Cl.
CPC ............... *H04N 21/234309* (2013.01); *H04N 19/105* (2014.11); *H04N 19/154* (2014.11);
(Continued)

(58) Field of Classification Search
CPC ......... H04N 21/234309; H04N 19/105; H04N 19/154; H04N 19/172; H04N 19/40;
(Continued)

(56) References Cited

U.S. PATENT DOCUMENTS 10,356,444 B2 7/2019 Leleannec et al.
10,515,667 B2 12/2019 De Haan et al.
(Continued)

FOREIGN PATENT DOCUMENTS

| CN | 110213616 A | 9/2019 |
| CN | 110856044 A | 2/2020 |
| KR | 10-2020-0095651 A | 8/2020 |

OTHER PUBLICATIONS

Communication dated Feb. 17, 2022 issued by the International Searching Authority in counterpart Application No. PCT/KR2021/016468 (PCT/ISA/220, PCT/ISA/210, and PCT/ISA/237).
(Continued)

*Primary Examiner* — Anthony Bantamoi
(74) *Attorney, Agent, or Firm* — Sughrue Mion, PLLC

(57) ABSTRACT

Disclosed is a content sharing method, an electronic device and a non-transitory computer-readable storage medium, wherein the content sharing method includes: receiving a target video, determining a type of video sharing based on the target video not being a High Dynamic Range 10+ (HDR10+) standard video, selectively transcoding the target video to a different standard video based on whether the determined type of video sharing is a real-time video sharing, and sending the transcoded target video to a target receiver.

18 Claims, 10 Drawing Sheets

(51) Int. Cl.
　　　*H04N 19/154*　　(2014.01)
　　　*H04N 19/172*　　(2014.01)
　　　*H04N 19/40*　　　(2014.01)
　　　*H04N 21/234*　　(2011.01)

(52) U.S. Cl.
　　　CPC ........... *H04N 19/172* (2014.11); *H04N 19/40* (2014.11); *H04N 21/23418* (2013.01)

(58) Field of Classification Search
　　　CPC ......... H04N 21/23418; H04N 21/2187; H04N 21/26258; H04N 21/643; H04N 21/64707; H04N 21/8456; H04N 21/2743
　　　See application file for complete search history.

(56) References Cited

U.S. PATENT DOCUMENTS

| | | | |
|---|---|---|---|
| 2008/0235746 A1* | 9/2008 | Peters | H04N 7/173 |
| 2016/0007050 A1* | 1/2016 | Rusert | H04N 19/96 |
| 2017/0054764 A1* | 2/2017 | Sharma | H04L 65/4069 |
| 2018/0007363 A1 | 1/2018 | Oh et al. | |
| 2018/0242006 A1 | 8/2018 | Kerofsky et al. | |
| 2020/0252687 A1 | 8/2020 | Ryu et al. | |
| 2021/0321020 A1* | 10/2021 | Wang | H04N 5/21 |

OTHER PUBLICATIONS

Communication dated Jul. 4, 2022 by the State Intellectual Property Office of People's Republic of China in CN Patent Application No. 202011291202.8.

* cited by examiner

CONTENT SHARING METHOD AND DEVICE

CROSS-REFERENCE TO RELATED APPLICATION(S)

This application is a bypass continuation application of International Application No. PCT/KR2021/16468, filed on Nov. 11, 2021, which claims priority to Chinese Patent Application No. 202011291202.8 filed in the Chinese Patent Office on Nov. 18, 2020, the disclosures of which are incorporated by reference in their entireties

BACKGROUND

1. Field

The disclosure relates to a technical field of computers, in particular to a method, an electronic device and a non-transitory computer readable storage medium for content sharing.

2. Description of Related Art

High Dynamic Range Imaging (HDR or HDRI) technology, in computer graphics and cinematography, are a set of techniques used to achieve a greater exposure dynamic range (i.e. greater light-to-dark differences) than conventional digital imaging techniques (i.e., Standard Dynamic Range). With the development of technology, many smart devices support HDR10+ technology, which is an improved version of the HDR technology. However, there are still many devices that do not support the HDR10+ technology.

According to related-art digital imaging techniques, even for a same image, there is a large variation in quality of a content depending on performance of a device. Some smart devices do not support the HDR10+ technology, when these smart devices share their captured content or other a low-quality content with high-performance smart devices supporting the HDR10+ technology, the high-performance smart devices supporting the HDR10+ technology cannot obtain high-quality playback of the shared content.

SUMMARY

Example embodiments of this disclosure provides a content sharing method and device which may effectively improve a content sharing quality.

According to an embodiment, there is provided a content sharing method which may include receiving a target video, determining a type of video sharing based on the target video not being a High Dynamic Range 10+ (HDR10+) standard video, selectively transcoding the target video to a different standard video based on whether the determined type of video sharing is a real-time video sharing, and sending the transcoded target video to a target receiver.

According to an embodiment, there is provided an electronic device which may include a memory configured to store one or more instructions, and at least one processor configured to execute the one or more instruction stored in the memory to receive a target video, determine a type of video sharing based on the target video not being an HDR10+ standard video, selectively transcode the target video to a different standard video based on whether the determined type of video sharing is a real-time video sharing, and send the transcoded target video to a target receiver.

According to an embodiment, there is provided a non-transitory computer-readable storage medium, having a computer program stored thereon that performs, when executed by a processor, the method provided in the embodiment of the present application.

According to an embodiment, there is provided an electronic device for content sharing which may include: a memory configured to store one or more instructions; and at least one processor configured to execute the one or more instruction stored in the memory to receive, from at least one user device, at least one first video complying at least one lower dynamic range standard, selectively transcode the at least one first video into at least one second video complying at least one higher dynamic range standard based on an image quality of the at least one first video, and send the at least one second video to a target receiver.

The various effects and benefits of the above embodiments will be described below.

BRIEF DESCRIPTION OF THE DRAWINGS

The embodiments of the disclosure will be more clearly understood from the following detailed description taken in conjunction with the accompanying drawings in which.

DETAILED DESCRIPTION

In order to make the objectives, technical solutions, and advantages of the present disclosure clearer, the present disclosure will be further described below in detail by embodiments with reference to the accompanying drawings. Each of the embodiments provided in the following description is not excluded from being associated with one or more features of another example or another embodiment also provided herein or not provided herein but consistent with the inventive concept. For example, even if matters described in a specific example are not described in a different example thereto, the matters may be understood as being related to or combined with the different example, unless otherwise mentioned in descriptions thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
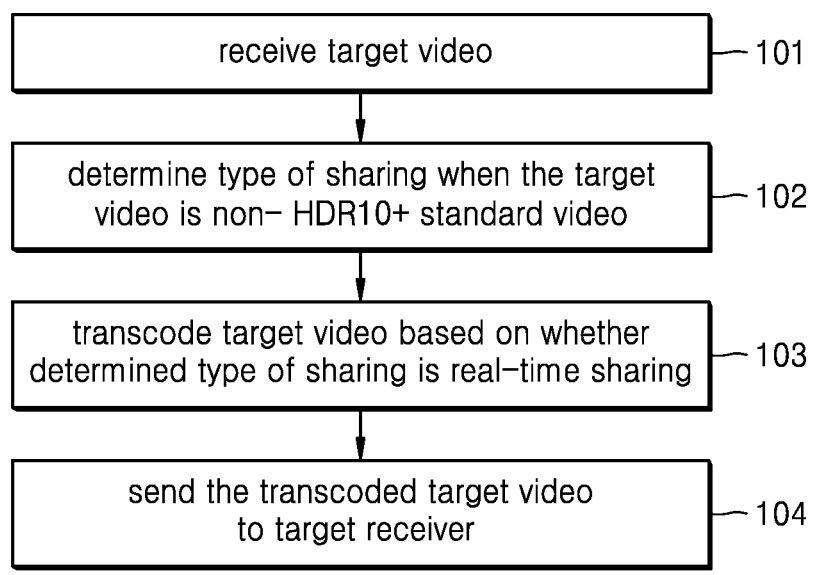
FIG. 1 is a flow diagram of a content sharing method, according to an embodiment.

FIG. 1 is a flow diagram of a content sharing method according to embodiments. As shown in FIG. 1, the content sharing method implemented by the embodiment mainly includes following steps.

In operation 101, a mobile edge computing (MEC) server receives a target video that a user needs to share.

In operation 102, the MEC server determines the type of sharing when the target video is a non-HDR10+ standard video.

In this operation, the MEC server needs to determine the type of sharing when the target video is a non-HDR10+ standard video. When the target video is an HDR10+ standard video, the MEC server does not need to transcode the target video and send the transcoded target video to a target receiver. When the target video is a non-HDR10+ standard video, MEC server needs to further determine whether the type of sharing is a real-time sharing to avoid an influence of transcoding processing on a sharing efficiency of the target video.

In operation 103, the MEC server transcodes the target video based on the type of sharing determined in operation 102, and, in operation 104, the MEC server sends the target video transcoded in operation 103 to a target receiver.

According to an embodiment, information on the type of sharing may be included in a video sharing request from a user terminal of the user, which may be sent to the MEC server along with or separately from the target video for transcoding. According to another embodiment, the information on the type of sharing may be included in a video sharing request of the target receiver.

In these operations, the MEC server performs the transcoding of the target video into an HDR10 standard video or an HDR10+ standard video in a slice transcoding mode if the sharing type is real-time sharing, and sends the transcoded target video to the target receiver in real time. Otherwise, the MEC server performs transcoding of the entirety of the target vide into an HDR10+ standard video, and sends the entirely transcoded target video to the target receiver.

It is understood here that the MEC server may also represent a multi-access edge computing server. However, the MEC server may be a different type of a server computing device, according to embodiments.

Considering that the real-time sharing requires a greater video transmission delay, the MEC server may perform transcoding of the target video into an HDR10 standard video or an HDR10+ standard video in a slice transcoding mode, and sends the transcoded slices of the target video to the target receiver in real time. Thus, the transcoded slices of the target video can be transmitted while the remaining slices of the target video are being transcoded, without waiting for the entire target video to be transcoded and then transmitted to the target receiver. Therefore, the influence of a transcoding time overhead on real-time video sharing can be overcome, and a sharing quality of the target video can be improved while the real-time sharing is realized.

In these operations, considering that a non-real-time sharing requires a low video transmission delay, it is not necessary to slice the target video and transcode the video slices. Instead, the entire target video is directly transcoded and sent to the target receiver. Therefore, a video transcoding processing overhead is reduced while the video sharing quality is improved by fully utilizing the high computing power of the MEC server.

In practical application, when the transcoded target video is sent to the target receiver, adaptive streaming (ABR) data may be generated according to different code rates, resolutions and other parameters, and the generated ABR data may be transmitted to the target receiver.

According to the above embodiment, transcoding the target video based on the type of sharing that is a real-time sharing includes performing transcoding the target video into an HDR10 standard video or an HDR10+ standard video in a slice transcoding mode.

Also, according to the above embodiment, transcoding the target video based on the type of sharing that is a non-real-time sharing includes performing transcoding the entire target video into an HDR10 standard video or an HDR10+ standard video.

In one implementation, in order to reduce a transcoding overhead and improve a transcoding efficiency as much as possible, transcoding the target video into the HDR10 standard video or the HDR10+ standard video may be performed in a slice transcoding mode as a following method: slicing the target video in to a plurality video slices; decoding each video slice of the target video obtained from slicing; determining whether the video slice needs to improve an image quality according to a decoding result; and transcoding the video slice into a video of the HDR10 standard or the HDR10+ standard when the video slice needs to improve an image quality according to the decoding result, and outputting the video slice directly without transcoding when the video slice does not need to improve an image quality according to the decoding result.

In the above method, before transcoding the video slices, determining an image quality of the video slices is performed. According to a result of the determination, only video slices with a poor image quality may be converted into the video of the HDR10 standard or the HDR10+ standard to improve their image quality, and transcoding is not needed for the video slices with a good image quality. As such, the video slices are filtered based on the image quality, and then only the selected video slices are transcoded, so that the transcoding overhead can be greatly reduced, and the transcoding efficiency is improved, thereby ensuring that the video slices are transmitted in real time.

In the above method, the length of each video slice may be preset by a user according to actual requirements, the length of each video slice may be set to be an appropriate value by comprehensively considering various factors such as a slicing processing overhead, a requirement of transcoding in real time and a requirement of a video sharing image quality. According to an embodiment, the target video may be sliced in units of image frames, and thus, a video slice may include at least one image frame.

According to an embodiment, for determining whether a video slice needs to improve an image quality based on the decoding result, the method may also include determining a reference object in at least one image frame in the video slice. The method may include determining a bright part proportion and a dark part proportion of the reference object in the image frame, and determining that the video slice needs to improve an image quality based on whether the video slice satisfies a preset condition for improving an image quality according to the bright part proportion and the dark part proportion of the reference object as determined. According to an embodiment, the reference object may be set to be a main object in the image frame or a predetermined area of the image frame.

According to an embodiment, for determining that the video slice needs to improve an image quality based on whether the video slice satisfies the preset condition according to the bright part proportion and the dark part proportion of the reference object, the method may include determining at least one of a preset bright part proportion threshold value a, a preset dark part proportion threshold value, and a preset combined proportion threshold value. The method may include determining that the video slice needs to improve an image quality when at least one of following conditions are satisfied: (i) the bright part proportion is greater than the preset bright part proportion threshold value; (ii) the dark part proportion is greater than the preset dark part proportion; and (iii) a sum of the bright part proportion and the dark part proportion is greater than the preset combined proportion threshold value.

According to an embodiment, in order to improve an accuracy of filtering a video slice to be transcoded, a following method may be used to determine whether a video slice needs to improve an image quality.

In operation x1, for each image frame in the video slice, a reference object is determined, and a bright part proportion and a dark part proportion of the reference object are determined.

In this operation, determining the reference object in each image frame may be performed by an existing image detection method, which will not be described in detail herein.

Here, the bright part proportion refers to a ratio of a bright part region of the reference object to a total area of the reference object, and the dark part proportion refers to a ratio of a dark part region of the reference object to the total area of the reference object. Determining the bright part region and the dark part region of the reference object may also be performed by an existing method. For instance, a region with a brightness value greater than a preset maximum brightness threshold is a bright part region, and a region with the brightness value less than the preset minimum brightness threshold is a dark part region.

In operation x2, whether the video slice satisfies a preset condition for improving an image quality is determined according to the bright part proportion and the dark part proportion, and if the preset condition is satisfied, it is determined that the video slice needs to improve the image quality.

In this operation, the image quality improving condition may be flexibly set according to actual requirements.

For example, the image quality improving condition may be a proportion of the number of image frames with a poor image quality in a video slice in the total number of image frames in the video slice is greater than a preset threshold value.

In an image frame with a poor image quality, a sum of a bright part proportion and a dark part proportion may be greater than a preset combined proportion threshold, or the bright part proportion is greater than a preset bright part proportion threshold value, and/or the dark part proportion is greater than a preset dark part proportion threshold value.

Here, more image frames in a video slice having a poor image quality indicates that there are many regions in which image details are lost in an image frame, and the video slice needed to be transcoded to the HDR10 standard video or the HDR10+ standard video to improve the image details.

According to an embodiment, to minimize a transcoding overhead, a video slice may be transcoded into the HDR10 standard video or the HDR10+ standard video according to a video standard type of the video slice by a following method.

If the video standard type of the video slice is a Standard Dynamic Range (SDR) standard, the video slice is transcoded into the HDR10 standard video or the HDR10+ standard video. Here, it is understood that the SDR standard is a lower dynamic range standard compared to the HDR10 standard, which is a lower dynamic range standard compared to the HDR10+ standard.

If the video standard type of the video slice is the HDR10 standard, the video slice is transcoded into the HDR10+ standard video.

In the method described above, when the video standard type of the video slice is the SDR standard, the transcoding target may be the HDR10 standard or the HDR10+ standard, and is not limited to the HDR10+ standard any more. Thus, since an operation overhead of transcoding to the HDR10 standard is less than that of transcoding to the HDR10+ standard, an overhead of a transcoding process is less than that of uniformly transcoding all video slices to the HDR10+ standard video.

According to an embodiment, to transcode a video slice into a video of the HDR10 standard or a video of the HDR10+ standard when the video slice needs to improve an image quality according to a decoding result, a preset image quality degree may be determined. In this embodiment, the video slice may be transcoded into the video of the HDR10+ standard when the image quality of the video slice is lower than the preset image quality degree, and the video slice may be transcoded into the video of the HDR10 standard when the preset image quality degree is lower than the image quality of the video slice.

Considering that the HDR10+ standard has a stronger ability to expand image details than the HDR10 standard, it is possible to transcode video slices with a poor image quality into the HDR10+ standard, and transcode video slices with a less poor image quality into the HDR10 standard. Thus, according to an embodiment, a criterion for transcoding a target video may be determined based on an image quality of a video slice and a principle of transcoding the target video to an HDR10+ standard video if an image quality of the video slice is poor to a preset degree, and otherwise transcoding the video slice to the HDR10 standard. As such, video slices with a less poor image quality may be transcoded into an HDR10 standard video so that a transcoding operation overhead can be reduced and a transcoding efficiency can be improved while an overall image quality of a target video is improved.

Figure 2:
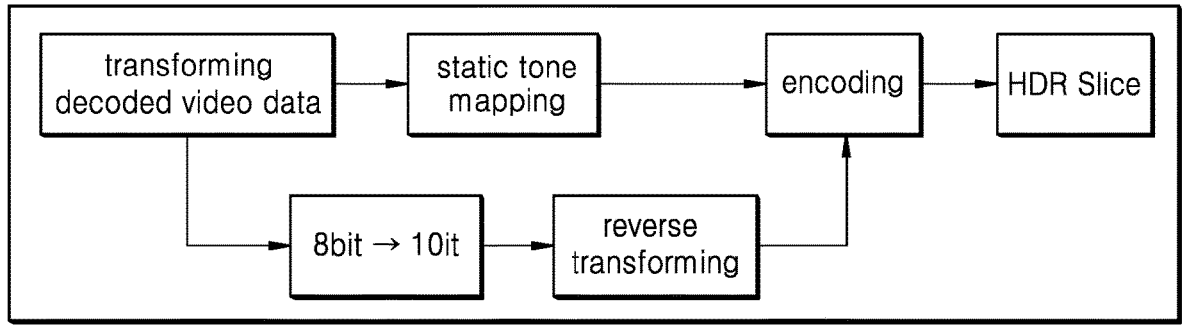
FIG. 2 is a schematic diagram illustrating a method for transcoding a Standard Dynamic Range (SDR) standard video to a High Dynamic Range 10 (HDR10) standard video.
Figure 3:
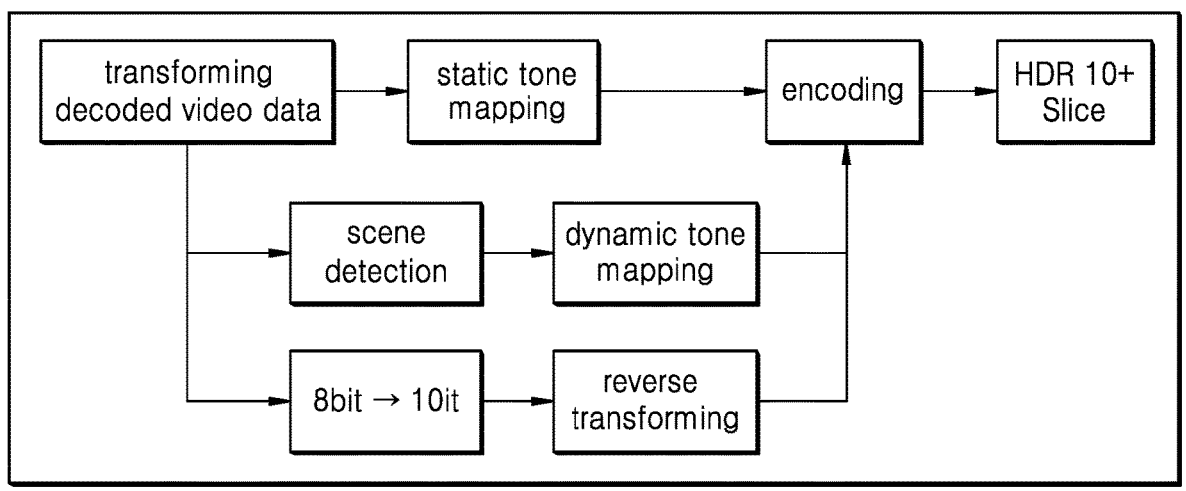
FIG. 3 is a schematic diagram illustrating a method for transcoding an SDR standard video to a High Dynamic Range 10+ (HDR10+) standard video.
Figure 4:
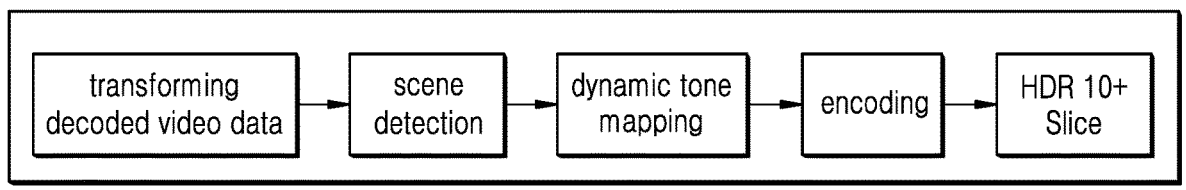
FIG. 4 is a schematic diagram illustrating a method for transcoding an HDR standard video to an HDR10+ standard video.

Transcoding an SDR standard video to an HDR10 standard video or an HDR10+ standard video, and transcoding an HDR10 standard video to an HDR10+ standard video in the method described above may be implemented by a related art, as specifically shown in FIGS. 2 to 4.

FIG. 2 is a schematic diagram illustrating a method for transcoding an SDR standard video to an HDR10 standard video. The method mainly includes, as illustrated in FIG. 2: transforming decoded data of a video; computing static tone mapping (STM) and upgrading contents of 8 bits to 10 bits frame by frame; then, reverse transforming the contents upgraded to 10 bits, and finally, encoding the contents into the HDR standard video.

FIG. 3 is a schematic diagram illustrating a method for transcoding an SDR standard video to an HDR10+ standard video. The method mainly includes, as illustrated in FIG. 3:

transforming decoded data of a video; computing STM, carrying out scene detection on the decoded data, computing dynamic tone mapping (DTM) according to the scene detection data, upgrading contents of 8 bits to 10 bits frame by frame, and reversely transforming on the contents upgraded to 10 bits; finally, encoding the contents into the HDR10+ standard video.

FIG. 4 is a schematic diagram illustrating a method for transcoding an HDR standard video to an HDR10+ standard video. The method mainly includes, as illustrated in FIG. 4: transforming decoded data of a video; carrying out scene detection on the decoded data, and computing DTM according to the scene detection data; upgrading contents of 8 bits to 10 bits frame by frame, and reversely transforming on the contents upgraded to 10 bits; finally, encoding the contents into HDR10+.

In the above-described transcoding processes, transforming decoded data of the video specifically includes: transforming from an YUV color model to an RGB color model, transforming from a legal range to a full range, transforming non-linear color values to linear color values by an electro-optical transfer function (EOTF), transforming from an Rec. 709 gamut to a DCI-P3 gamut, and transforming from a BT. 2020 gamut to the DCI-P3 gamut.

Reversely transforming the contents upgraded to 10 bits includes: transforming from the RGB color model to the YUV color model, transforming from the full range to the legal range, transforming non-linear color values to linear color values by the EOTF function, and transforming from the DCI-P3 gamut to the BT.2020 gamut.

According to an embodiment, the MEC server described above may store the transcoding result of the target video in a memory, which may be a local cache, so that other terminals may directly request the MEC server to send the transcoding result of the target video to the other terminals to improve a utilization rate of the transcoding result of the target video. Furthermore, in order to avoid that the storage of the video transcoding results is limited by the size of the local cache of the MEC server, a reverse storage mode can be adopted, and when an occupancy rate of the local cache reaches a certain degree, some video transcoding results are selected to be uploaded to a content distribution network (CDN) server, as may be implemented by a following method.

A video transcoding result satisfying a preset uploading condition is selected by the MEC server based on a local cache when an occupancy rate of the local cache reaches a preset occupancy threshold, according to an embodiment. The video transcoding result may be stored in a CDN server of an upper MEC server which may be an upper-level server of the MEC server, and then the video transcoding result in the local cache is deleted.

In the method described above, a user may flexibly set the uploading condition according to actual requirements. For instance, the uploading condition may be to select a video transcoding result with a highest uploading priority, and an uploading priority may be calculated by means of weight calculation based on a storage time and a frequency of sharing request.

The occupancy threshold is used for controlling an occasion of reverse storage, and may be specifically set by the user according to actual requirements. For example, the occupancy threshold may be a value in a range of 70% to 99%, but not limited thereto.

Here, the video transcoding result may be a segment of a transcoded video such as one or more slices among a plurality slices forming the transcoded video or the transcoded video among a plurality videos each of which includes a respective number of transcoded video slices.

In one implementation, in order to reduce the transmission overhead of the video transcoding result and improve the sharing efficiency, the MEC server for transcoding the target video may be selected from lower-level MEC servers at the target receiver side. That is, the MEC server may be selected from lower-level MEC servers at the target receiver side by its upper-level MEC server according to a load and a cache of the MEC server.

In the method described above, the comprehensive priority value of each lower-level MEC server at the target receiver side may be specifically calculated on the basis of the load and the cache of the MEC server by adopting the principle that a small load and a large priority value, a more cache and a greater priority value, and a lower MEC server with the largest comprehensive priority value is selected as the MEC server for transcoding the target video. But the method is not limited to the above, and other load balancing methods may also be employed to select the MEC server for transcoding the target video.

Further, in one implementation, different parts of a same video sent by different users may be respectively transcoded, and then, combined, and finally the combined result is sent to each user. Based on this scenario, operation 101 of receiving the target video that a user needs to share in FIG. 1 may specifically employ a following method.

When a video transcoding and merging request is received, the video transcoding and merging request carries a target video, and the target video is a video segment of a first video.

Based on the video transcoding and merging request, a transcoding result of the video segment is ordered and merged by the MEC server according to a number sequence of the video segment, and a merging result is fed back to a user terminal corresponding to the video transcoding and merging request, when all video segments of the first video are received and transcoded into an HDR10+ standard video.

In the embodiments of the method described above, a non-HDR10+ standard video is converted into the higher standard video by the MEC server, so that the high computing power of the MEC server is fully utilized to improve an image quality of the non-HDR10+ video needed to be shared, and thus, a high-performance smart device supporting the HDR10+ technology may obtain high-quality playback of a shared content. In addition, for videos needed to be shared in real time, transcoding a target video into an HDR10 standard video or an HDR10+ standard video is performed in a slice transcoding mode, and the transcoding result is sent to a target receiver in real time. As such, it is ensured that video sharing proceeds in real time while an image quality of shared videos is improved, and a user experience is improved. Therefore, a quality of the shared content may be effectively improved by adopting the above embodiments.

Specific applications of the embodiments of the method described above are described in detail below in connection with several specific application scenarios.

Figure 5:
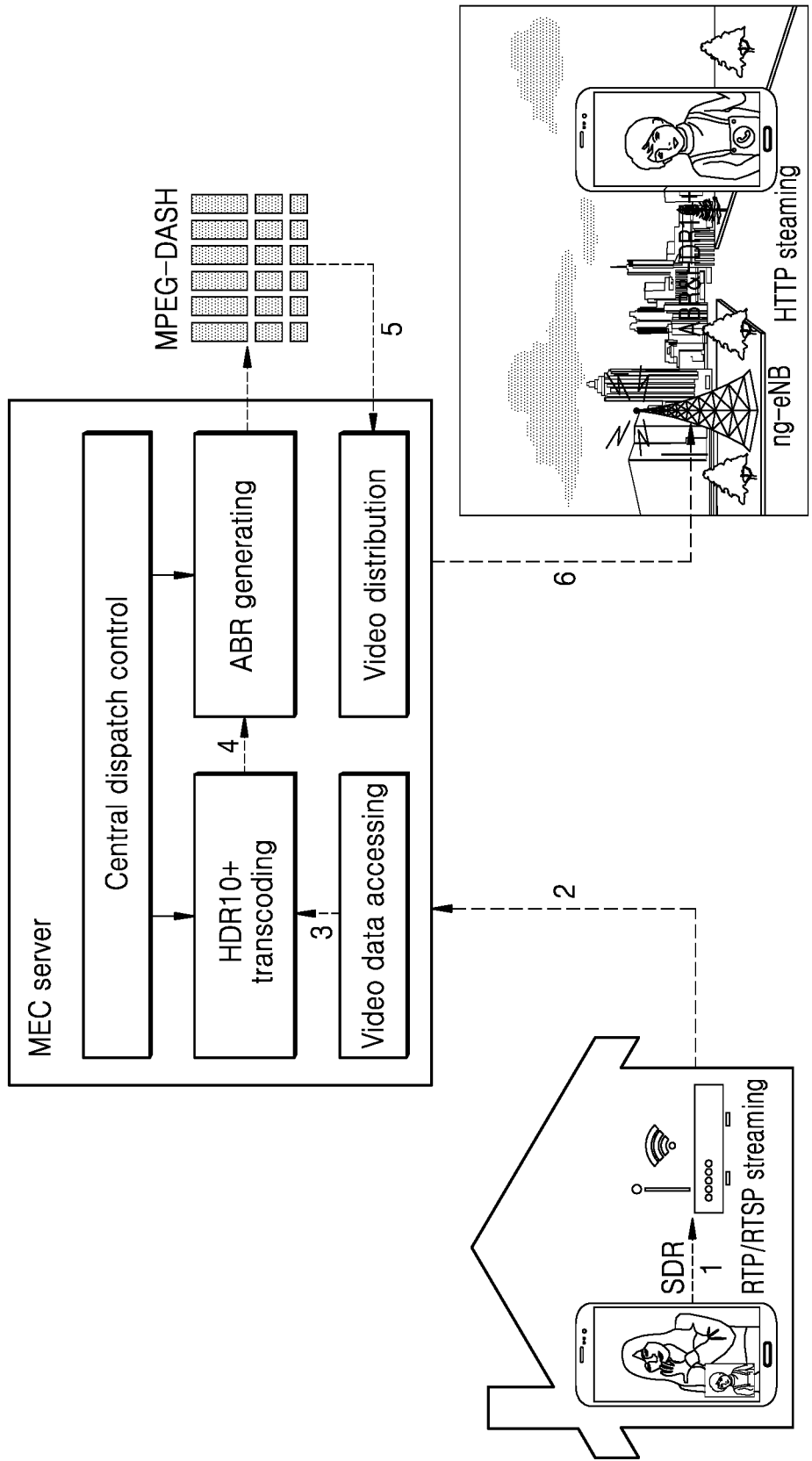
FIG. 5 is a schematic diagram of embodiments of the present disclosure applied to scenario one, according to an embodiment.

FIG. 5 is a schematic diagram of embodiments of the method described above applied to scenario one. This scenario enables real-time sharing of an HDR10+ video from one mobile device end to another mobile device end, as shown in FIG. 5. The real-time sharing process may include following operations.

1. A user terminal initiates a video sharing request and transmits a lower-standard video such as an SDR standard video to an MEC server By Real-time Transport Protocol (RTP) or Real Time Streaming Protocol (RTSP).

2. The MEC server receives the SDR standard video data of the user terminal in video data accessing step.

3. The MEC server determines that a transcoding mode is a real-time transcoding mode, slices the SDR standard video data, determines a video standard among SDR, HDR and HDR10+ to which each video slice is to be transcoded, and transcode each video slice according to the determination;

4. Based on transcoding results of the video slices, the MEC server generates adaptive bitrate (ABR) streaming video data according to different code rates, resolutions and other parameters. ABR and transcoding may be controlled by control dispatch.

5. The MEC server sends the ABR video data by HTTP adaptive streaming such as MPEG-DASH; and 6. The MEC server sends transcoded video to base station such as ng-eNB in video distribution step. The user terminal receives and plays the transcoded video in real time by HTTP streaming.

Figure 6:
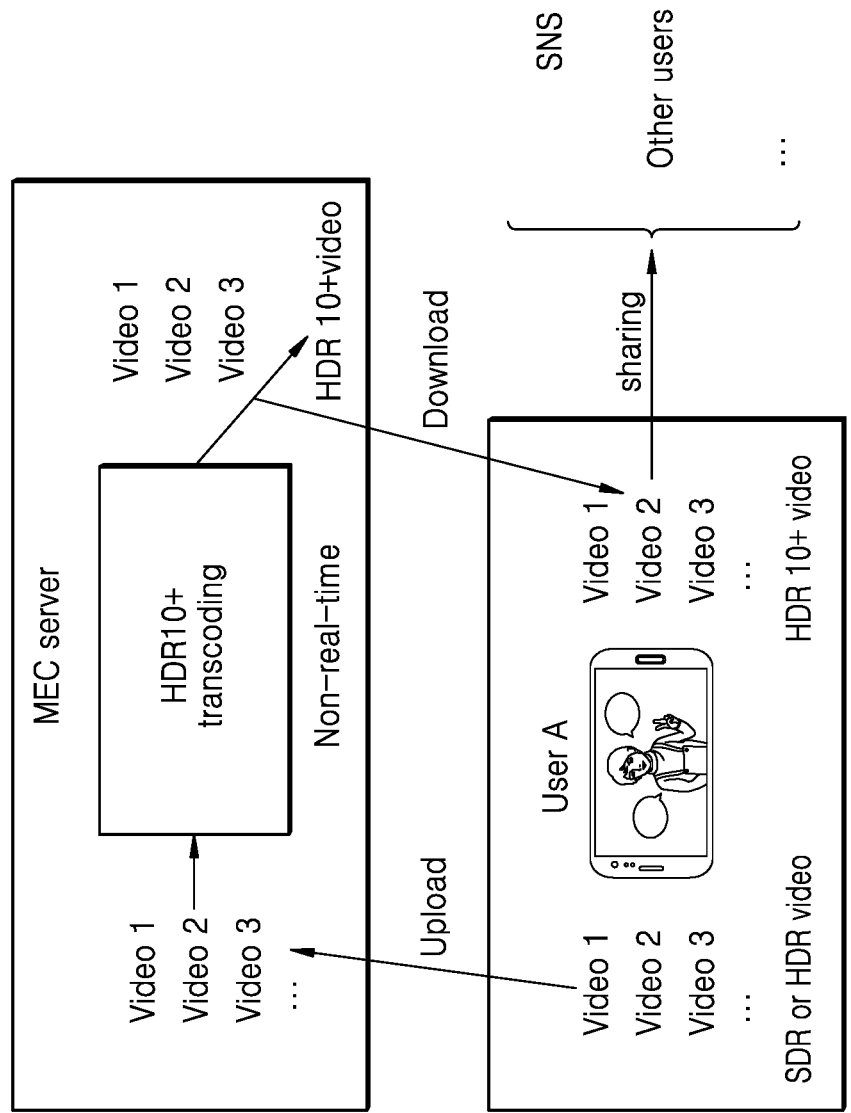
FIG. 6 is a schematic diagram of embodiments of the present disclosure applied to scenario two, according to an embodiment.

FIG. 6 is a schematic diagram of embodiments of the method described above applied to scenario two. In this scenario, a mobile device transcodes a local non-HDR10+ video through an MEC server and share the transcoded video with a social platform, as shown in FIG. 6. The sharing process mainly includes following operations.

1. A user sends a transcoding request to an MEC server and uploads local video to the MEC server. The local video may include a plurality videos 1 to 3.

2. The MEC server transcodes the video.

3. The MEC server sends the transcoded video, which may be an HDR10+ video, to the user.

4. The user publishes the HDR10+ video to social media platforms or social network services (SNS), or shares it with other users.

Figure 7:
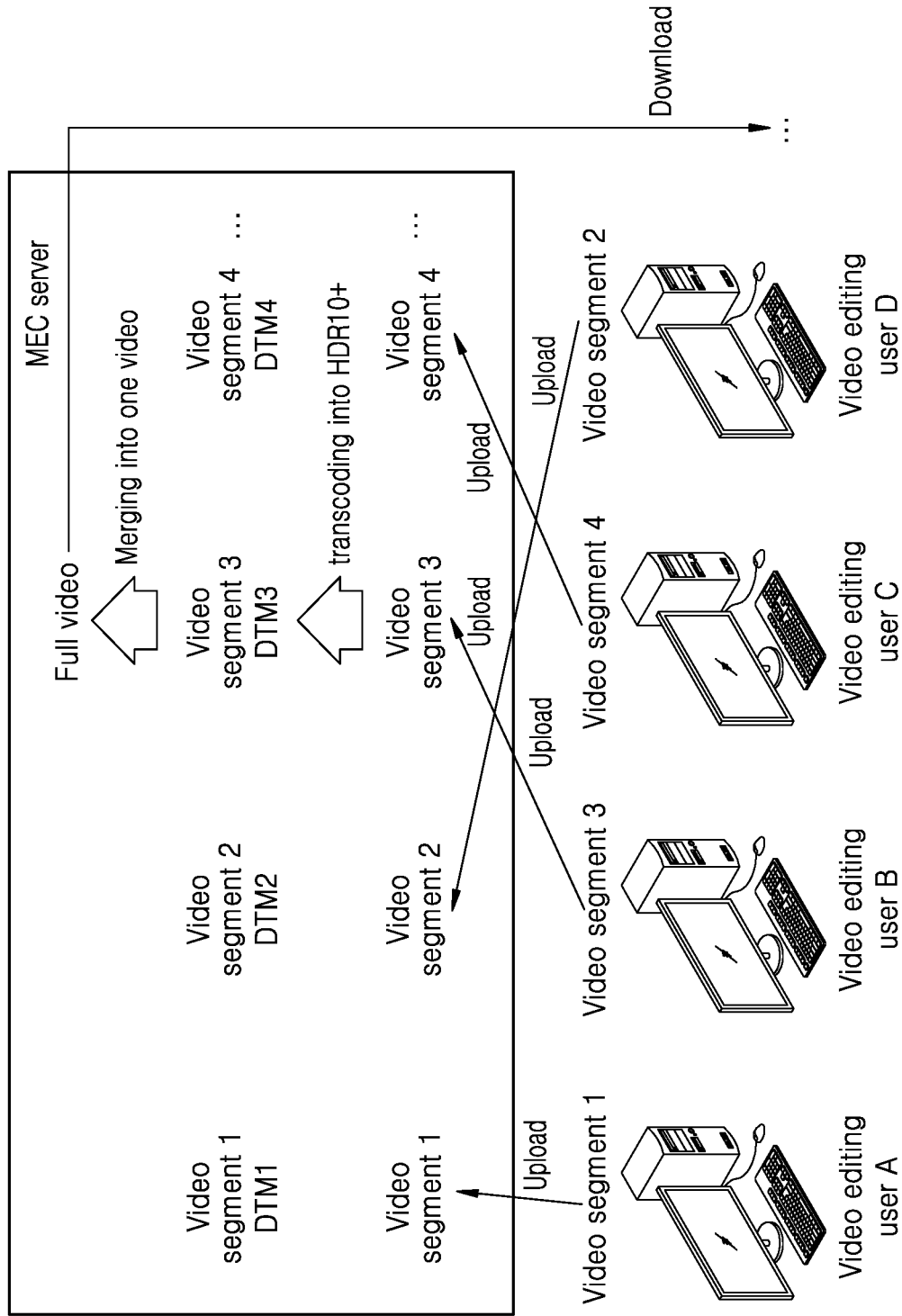
FIG. 7 is a schematic diagram of embodiments of the present disclosure applied to scenario three, according to an embodiment.

FIG. 7 is a schematic diagram of embodiments of the method described above applied to scenario three. This scenario may achieve that multiple users cooperatively clip an HDR10+ video, i.e. several segments having a number sequence are transcoded by an MEC server and merged into one complete video, as shown in FIG. 7. The sharing process mainly includes following operations.

1. Video editing users A, B, C and D respectively send transcoding and merging requests to an MEC server, and upload local contents of a video to the MEC server. Here the local contents may be respective segments 1 to 4 of the video.

2. The MEC server respectively transcodes each segment of the video. and

3. The MEC server sorts the transcoded segments of the video in an order of the number sequence, and merges the transcoded segments of the video based on the sorting result to obtain a complete HDR10+ video.

Figure 8:
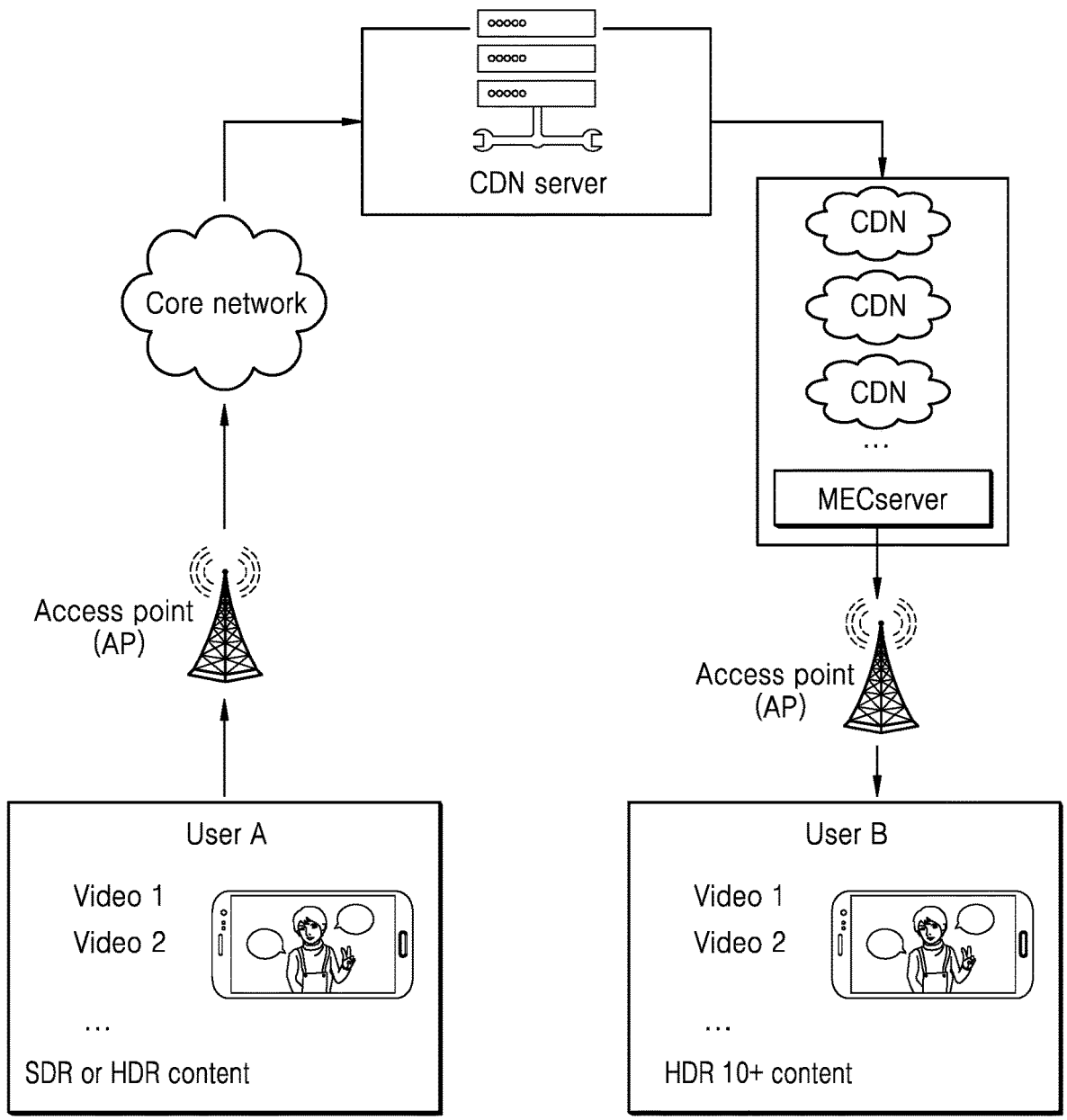
FIG. 8 is a schematic diagram of embodiments of the present disclosure applied to scenario four, according to an embodiment.

FIG. 8 is a schematic diagram of embodiments of the method described above applied to scenario four. This scenario implements remote sharing, as shown in FIG. 8. The sharing process mainly includes following operations.

1. A user A initiates content sharing and uploads a target video to be shared to a CDN server through an access point (AP) and a core network.

2. The CDN server sends the tasks to an upper-level MEC server through a CDN network;

3. The upper-level MEC server selects one MEC server from a set of remote MEC servers (i.e. MEC servers close to a receiver) according to a load and a cache capacity of the remove servers, that is, lower-level MEC servers, and the selected MEC server performs transcoding and sharing of the target video.

4. The selected MEC server sends the transcoded video to a user B.

Figure 9:
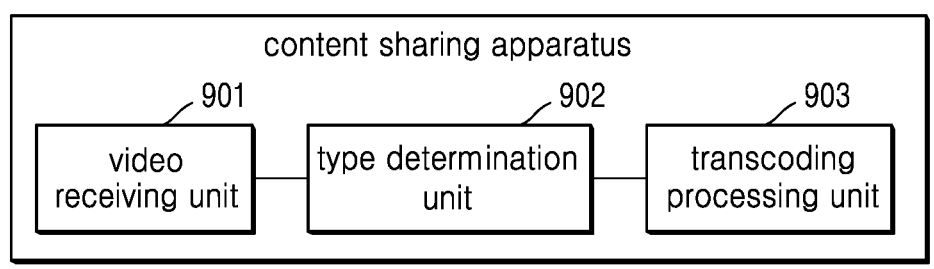
FIG. 9 is a schematic diagram of a structure of a content sharing apparatus, according to an embodiment.

FIG. 9 is a schematic diagram of a structure of a content sharing apparatus, according to an embodiment. The content sharing apparatus shown in FIG. 9 may be included in an MEC server, and may include a video receiver 901, a type determination module 902, and a transcoding processor 903. According to an embodiment, the content sharing apparatus may be provided separately from the MEC server.

The video receiver 901 may be configured to receive a target video that a user needs to share.

The type determination module 902 may be configured to determine a type of sharing when the target video is a non-HDR10+ standard video.

The transcoding processor 903 may be configured to perform transcoding of the target video into an HDR10 standard video or an HDR10+ standard video in a slice transcoding mode if the sharing type is a real-time sharing, and send the transcode target video to a target receiver, or, transcode the entirety of the target video into an HDR10+ standard video, and send the transcoded target video to the target receiver.

For the transcoding processor 903 to performs transcoding of the target video into the HDR10 standard video or the HDR10+ standard video in the slice transcoding mode, the transcoding processor 903 may perform slicing the target video, and decoding each video slice obtained from the slicing, and determining whether the video slice needs to improve an image quality according to a decoding result. If it is determined that the video slice is needed to improve an image quality, the transcoding processor 903 may transcode the video slice into the HDR10 standard video or the HDR10+ standard video according to a video standard type of the video slice, or otherwise output directly the video slice without decoding.

For the transcoding processor 903 to determine whether the video slice needs to improve an image quality, the transcoding processor 903 may perform determining a reference object in at least one image frame of the video slice, determining a bright part proportion and a dark part proportion of the reference object, and determining whether the video slice satisfies a preset condition for improving an image quality according to the bright part proportion and the dark part proportion. If it is determined that the video slice satisfies the preset condition, the transcoding processor 903 determines that the video slice needs to improve an image quality.

For the transcoding processor 903 to transcode the video slice into the HDR10 standard video or the HDR10+ standard video according to a video standard type of the video slice, the transcoding processor 903 may performed: transcoding the video slice into the HDR10 standard video or the HDR10+ standard video if the video standard type of the video slice is an SDR standard, and transcoding the video slice into the HDR10+ standard if the video standard type of the video slice is the HDR10 standard.

The transcoding processor 903 may be further configured to cache locally at least one video transcoding result of the target video, and select a video transcoding result satisfying a preset uploading condition from a local cache when an occupancy rate of the local cache reaches a preset occupancy threshold. The transcoding processor 903 may be further configured to store the selected video transcoding result in a CDN server of an upper-level MEC server, and delete the video transcoding result in the local cache. Here, the video transcoding result may be a segment of a transcoded video such as one or more slices among a plurality slices forming the transcoded video or the transcoded video among a plurality videos each of which includes a respective number of transcoded video slices.

An MEC server to store the transcoding results may be selected, by its upper-level MEC server, according to a load and cache of the MEC server, from a plurality lower-level MEC servers at a target receiver side, according to respective loads and caches of the lower-level MEC servers.

For the video receiver 901 to receive a target video that the user needs to share, the video receiver may perform receiving a video transcoding and merging request which includes the target video. Here, the target video may be a video segment of a certain video.

The transcoding processor 903 may be further configured to sort and merge the video transcoding result of a plurality video segments according to a number sequence of the video segments based on a video transcoding and merging request, and feed a merging result back to a user terminal that initiated the video transcoding and merging request when all of the video segments of the certain video are received and transcoded into the HDR10+ standard video.

The video receiver 901 may include any one or any combination of a digital modem, a radio frequency (RF) modem, a WiFi chip, and related software and/or firmware. The type determination module 902 and the transcoding processor 903 each may be embodied as various numbers of hardware, such as a central processing unit (CPU) or an application processor (AP), software and/or firmware structures that execute respective functions described above, according to an embodiment. Also, at least part of functions of at least one of these two elements may be performed by another of these two elements.

Figure 10:
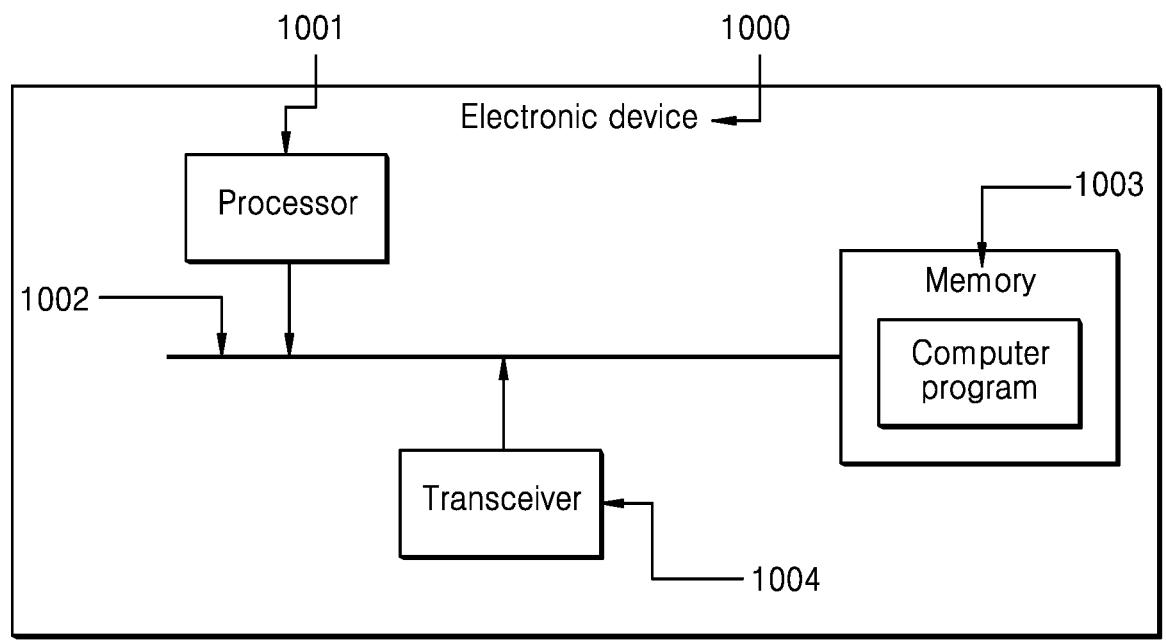
FIG. 10 is a schematic structural diagram of an electronic device, according to an embodiment.

FIG. 10 is a schematic structural diagram of an electronic device according to an embodiment. As shown in FIG. 10, an electronic device 1000 may include a processor 1001 and a memory 1003. The processor 1001 is connected to the memory 1003, for example, via a bus 1002. In an alternative embodiment, the electronic device 1000 may further include a transceiver 1004. It should be noted that the structure of the electronic device 1000 is not limited to this embodiment.

The memory 1003 may store an application executable by the processor 1001 to cause the processor 1001 to perform the content sharing method described above.

The embodiments also provide a non-transitory computer-readable storage medium storing computer-readable instructions for executing the content sharing method described above.

In the embodiments described above, the memory 1003 may be specifically implemented as a variety of storage media such as an electrically erasable programmable read only memory (EEPROM), a flash memory, a programmable program read only memory (PROM), etc. The memory 1003 may be a read only memory (ROM) or other types of static storage device that may store static information and instructions, a random access memory (RAM) or other types of dynamic storage device that may store information and instructions. It may also be a compact disc read only memory (CD-ROM) or other optical disc storage, disc storage (including compact disc, laser disc, optical disc, digital versatile disc, Blu-ray disc, etc.), magnetic disc storage medium or other magnetic storage device, or any other medium capable of carrying or storing computer program in the form of instructions or data structures and capable of being accessed by a computer, but is not limited thereto.

The processor 1001 may be a central processing unit (CPU), a general-purpose processor, a digital signal processor (DSP), an application specific integrated circuit (ASIC), or other programmable logic device, transistor logic device, hardware component, or any combination thereof. Various exemplary logic blocks, modules, and circuits described in connection with the present disclosure may be implemented or executed. The processor 4001 may also be a combination that implements computing functions, such as a combination that includes one or more microprocessors, a combination of DSP and microprocessors, etc. The processor 1001 may be implemented to include one or more central processing units or one or more field programmable gate arrays, wherein the field programmable gate arrays integrate one or more central processing unit cores. Specifically, the central processor or central processor core may be implemented as a CPU or MCU.

The bus 1002 may include a path to transfer information between the above components. The bus 1002 may be a peripheral component interconnect (PCI) bus or an extended industry standard architecture (EISA) bus or the like. The bus 4002 may be divided into an address bus, a data bus, a control bus, etc. For ease of representation, the bus is expressed by only one thick line in FIG. 10, but it does not mean that there is only one bus or one type of bus.

It should be understood that although various operations in the flowchart of the drawings are shown in sequence as indicated by arrows, these operations may not be necessarily performed in sequence as indicated by arrows. Unless explicitly stated herein, the execution of these operations is not strictly limited in sequence, but may be performed in other sequences. Moreover, at least part of the operations in the flowchart of the drawings may include a plurality of sub-operations or stages, which are not necessarily completed at the same time, but may be performed at different times, and the execution order thereof is not necessarily sequentially, but may be performed in turn or alternately with at least part of the sub-operations or stages of other operations or other operations.

It should be noted that not all of the operations and modules depicted in the above-described processes and structural diagrams are required, and that certain steps or modules may be omitted as required. The execution order of the operations is not fixed and may be adjusted as required. The division of each module is merely to facilitate the description of the functional division adopted, and in actual implementation, one module can be implemented by a plurality of modules, the functions of the plurality of modules can also be implemented by one same module, and the modules can be located in the same device or different devices.

The hardware modules in the various embodiments may be implemented mechanically or electronically. For example, a hardware module may include specially designed permanent circuits or logic devices (e.g. special purpose processors such as FPGA or ASiC) for performing specific operations. A hardware module may also include a programmable logic device or circuit (e.g. including a general purpose processor or other programmable processor) temporarily configured by software for performing specific operations. The implementation of a hardware module specifically by mechanical means, or by dedicated permanent circuit, or by temporarily configured circuit (e.g. configured in software) may depend on cost and time considerations.

Storage medium implementations for providing program code include floppy disks, hard disks, magneto-optical disks, optical disks (e.g. CD-ROM, CD-R, CD-RW, DVD-ROM, DVD-RAM, DVD-RW, DVD+RW), magnetic tapes, non-volatile memory cards, and ROM. Alternatively, the program code may be downloaded by the communication network from a server computer or cloud.

In one implementation, an electronic device for content sharing includes a memory configured to store one or more instructions. The electronic device further includes at least one processor configured to execute the one or more instruction stored in the memory to receive a target video that a user needs to share, determine a type of sharing when the target video is a non-HDR10+ standard video, perform transcoding of the target video based on the type of sharing and send a processing result to a target receiver.

In an alternative embodiment, when the type of sharing is real-time sharing, the at least one processor configured to execute the one or more instruction stored in the memory to perform transcoding of the target video into an HDR10 standard video or an HDR10+ standard video in a slice transcoding mode.

In an alternative embodiment, to perform transcoding of the target video into an HDR10 standard video or an HDR10+ standard video in a slice transcoding mode, the at least one processor configured to execute the one or more instruction stored in the memory to slice the target video, decode each video slice obtained from the slicing, determine whether the video slice needs to improve an image quality according to a decoding result, and transcode the video slice into a video of the HDR10 standard or a video of the HDR10+ standard when the video slice needs to improve an image quality according to the decoding result, and output the video slice directly without decoding when the video slice does not need to improve an image quality according to the decoding result.

In one implementation, a non-transitory computer-readable storage medium, having a computer program stored thereon that performs, when executed by a processor, the method provided in the embodiment of the present application.

Herein "schematic" means "serving as an example, instance, or explanation" and any illustration, implementation, described herein as "schematic" is not to be construed as a more preferred or advantageous technical scheme. For the purpose of clarity, only the parts of the drawings that are pertinent to the disclosure are shown schematically in the drawings and are not intended to represent the actual construction of the device or process. In addition, to simplify the drawing for ease of understanding, only one of components having the same structure or function in some of the drawings is illustrated schematically or is labeled. Herein, "one" does not denote that the number of relevant parts of the disclosure is limited to "only one", and "one" does not denote that the number of relevant parts of the disclosure "more than one" is excluded. As used herein, "upper, lower, front, rear, left, right, inner, outer" and the like are intended to refer only to the relative positional relationship between the associated portions and are not intended to limit the absolute position of these relevant portions.

The foregoing is a description of example embodiments of the disclosure and is not intended to limit the scope of the disclosure. Any modification, equivalent alternative, or improvement, etc. within the spirit and principle of the disclosure should be included in the scope of the disclosure.

What is claimed is:

1. A content sharing method performed at a server, the method comprising:
    receiving a target video;
    determining a type of video sharing based on the target video not being a High Dynamic Range 10+ (HDR10+) standard video;
    selectively transcoding the target video to a different standard video based on whether the determined type of video sharing is a real-time video sharing; and
    sending the transcoded target video to a target receiver,
    wherein the selectively transcoding the target video comprises transcoding the target video into an HDR10 standard video or the HDR10+ standard video in a slice transcoding mode based on the type of video sharing being the real-time video sharing,
    wherein each video slice includes at least one image frame of the target video.

2. The method of claim 1, wherein the selectively transcoding the target video, comprises:
    transcoding an entirety of the target video into an HDR10 standard video or an HDR10+ standard video based on the type of video sharing being a non-real-time video sharing.

3. The method of claim 1, wherein the selectively transcoding the target video comprises:
    slicing the target video;
    decoding each video slice obtained from the slicing; and
    determining to transcode the each video slice into the HDR10 standard video or the HDR10+ standard video according to a result of the decoding.

4. The method of claim 3, wherein the selectively transcoding the target video further comprises:
    transcoding the each video slice into the HDR10 standard video or the HDR10+ standard video based on the each video slice being determined to transcode the each video slice according to the result of the decoding; and
    outputting the each video slice without transcoding based on the each video slice not being determined to transcode according to the result of the decoding.

5. The method of claim 3, wherein the determining to transcode the each video slice into the HDR10 standard video or the HDR10+ standard video comprises:
    determining a reference object in each image frame of a plurality image frames included in the each video slice;
    determining a bright part proportion and a dark part proportion of the reference object; and
    determining to transcode the each video slice into the HDR10 standard video or the HDR10+ standard video according to the bright part proportion and the dark part proportion of the reference object.

6. The method of claim 5, wherein the determining to transcode the each video slice into the HDR10 standard video or the HDR10+ standard video according to the bright part proportion and the dark part proportion of the reference object comprises:
    determining a preset bright part proportion threshold value, a preset dark part proportion threshold value, and a preset combined proportion threshold value; and
    determining to transcode the each video slice into the HDR10 standard video or the HDR10+ standard video based on the bright part proportion being greater than the preset bright part proportion threshold value, the dark part proportion being greater than the preset dark part proportion, or a sum of the bright part proportion and the dark part proportion being greater than the preset combined proportion threshold value.

7. The method of claim 3, wherein the determining to transcode the each video slice into the HDR10 standard video or the HDR10+ standard video according to the result of the decoding comprises:
- transcoding the each video slice into the HDR10 standard video or the HDR10+ standard video based on a video standard type of the each video slice being a Standard Dynamic Range (SDR) standard; and
- transcoding the each video slice into the HDR10+ standard video based on the video standard type of the each video slice being the HDR10 standard.

8. The method of claim 3 wherein the determining to transcode the each video slice into the HDR10 standard video or the HDR10+ standard video according to the result of the decoding comprises:
- determining a preset image quality degree; and
- transcoding the each video slice into the HDR10+ standard video based on an image quality of the each video slice being lower than the preset image quality degree; and
- transcoding the each video slice into the HDR10 standard video based on the image quality of the each video slice being higher than the preset image quality degree.

9. The method of claim 1, further comprising:
- storing locally, in a local memory of the server, a result of the transcoding the target video;
- selecting at least a portion of the transcoding result satisfying a preset uploading condition from among the result of the transcoding based on an occupancy rate of the local memory reaches a preset occupation threshold;
- storing the selected portion of the result of the transcoding in an upper-level server of the server; and
- deleting the selected portion of the result of the transcoding in the local memory.

10. The method of claim 1, wherein the server is selected, by an upper-level server of the server, from among a plurality lower-level servers at a target receiver side, according to a load and an occupancy of a memory of the lower-level servers.

11. An electronic device for content sharing, comprising:
- a memory configured to store one or more instructions; and
- at least one processor configured to execute the one or more instruction stored in the memory to:
  - receive a target video;
  - determine a type of video sharing based on the target video not being a High Dynamic Range 10+ (HDR10+) standard video;
  - selectively transcode the target video to a different standard video based on whether the determined type of video sharing is a real-time video sharing; and
  - send the transcoded target video to a target receiver,
- wherein, to transcode the target video, the at least one processor is configured to execute the one or more instruction stored in the memory to transcode the target video into an HDR10 standard video or an HDR10+ standard video in a slice transcoding mode based on the type of video sharing is the real-time video sharing,
- wherein each video slice includes at least one image frame of the target video.

12. The electronic device of claim 11, wherein, to transcode the target video, the at least one processor is configured to execute the one or more instruction stored in the memory to:
- slice the target video;
- decode each video slice obtained from the slicing; and
- determine to transcode the each video slice into the HDR10 standard video or the HDR10+ standard video according to a result of the decoding.

13. A non-transitory computer-readable storage medium, having a computer program stored thereon that performs, when executed by a processor, the method according to claim 1.

14. An electronic device for content sharing, comprising:
- a memory configured to store one or more instructions; and
- at least one processor configured to execute the one or more instruction stored in the memory to:
  - receive, from at least one user device, at least one first video complying at least one lower dynamic range standard;
  - selectively transcode the at least one first video into at least one second video complying at least one higher dynamic range standard based on an image quality of the at least one first video; and
  - send the at least one second video to a target receiver,
- wherein, to selectively transcode the at least one first video, the at least one processor is configured to execute the one or more instruction stored in the memory to transcode the at least one first video into the at least one second video in a slice transcoding mode based on a type of video sharing is a real-time video sharing,
- wherein each video slice includes at least one image frame of the at least one first video.

15. The electronic device of claim 14, wherein the at least one processor is further configured to:
- slice the at least one first video into a plurality first video slices, transcode a portion of the first video slices into a portion of a plurality second video slices of the at least one second video, and send the portion of the second video slices to the target receiver while another portion of the first video slices is being transcoded to another portion of the second video slices of the at least one second video, based on a type pf video sharing requested by the at least one user device or the target device being a real-time sharing, and
- transcode an entirety of the at least one first video into the at least one second video, and send the entirety of the at least one second video to the target receiver.

16. The electronic device of claim 14, wherein the at least one processor is configured to:
- determine the image quality of the at least one first video based on a bright part proportion and a dark part proportion of a reference object in at least one image frame of the at least one first video;
- transcode the at least one first video to the at least one second video based on the bright part proportion and the dark part proportion satisfying a predetermined condition, and send the at least one second video to the target receiver; and
- send the at least one first video to the target receiver based on the bright part proportion and the dark part proportion not satisfying the predetermined condition.

17. The electronic device of claim 14, wherein the at least one processor is configured to transcode a plurality first videos received from a plurality user devices into a plurality second videos, and
- wherein the plurality of first videos comply a plurality different lower dynamic range standards.

18. The electronic device of claim 17, wherein the at least one processor is further configured to merge the plurality second videos according to a predetermined order, and send the merged second videos to the target receiver.

\* \* \* \* \*